United States Patent
Fischer et al.

(10) Patent No.: US 7,477,712 B2
(45) Date of Patent: Jan. 13, 2009

(54) ADAPTABLE DATA PATH FOR SYNCHRONOUS DATA TRANSFER BETWEEN CLOCK DOMAINS

(75) Inventors: Timothy C. Fischer, Firestone, CO (US); Samuel Naffziger, Fort Collins, CO (US); Benjamin J. Patella, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 579 days.

(21) Appl. No.: 11/118,632

(22) Filed: Apr. 29, 2005

(65) Prior Publication Data

US 2006/0245529 A1 Nov. 2, 2006

(51) Int. Cl.
*H04L 7/02* (2006.01)

(52) U.S. Cl. .................. 375/359; 375/354; 375/355; 375/356; 375/60; 370/503; 370/507; 370/519

(58) Field of Classification Search .............. 375/226, 375/293, 354, 355–357, 359–360, 369, 362, 375/371, 375–376; 713/400, 401, 300, 500–502; 370/363
See application file for complete search history.

(56) References Cited

U.S. PATENT DOCUMENTS

| | | | |
|---|---|---|---|
| 5,487,097 A | 1/1996 | Jordan et al. | |
| 6,549,596 B1 | 4/2003 | Cretti et al. | |
| 6,574,380 B2 | 6/2003 | Ranalli | |
| 6,898,682 B2 | 5/2005 | Welker et al. | |
| 7,110,423 B1 * | 9/2006 | Sethuram et al. | 370/519 |
| 7,333,516 B1 | 2/2008 | Sikkink et al. | |
| 2003/0123588 A1 * | 7/2003 | Parikh | 375/354 |
| 2004/0044919 A1 * | 3/2004 | Dabral | 713/400 |
| 2004/0062137 A1 | 4/2004 | Phan et al. | |
| 2004/0225977 A1 * | 11/2004 | Akkerman | 716/6 |
| 2004/0243869 A1 | 12/2004 | Sharma et al. | |
| 2005/0200393 A1 * | 9/2005 | Furtner | 327/291 |
| 2005/0268265 A1 * | 12/2005 | Ly et al. | 716/6 |
| 2005/0286507 A1 * | 12/2005 | sterling et al. | 370/363 |
| 2006/0020843 A1 | 1/2006 | Frodsham et al. | |
| 2006/0091912 A1 | 5/2006 | Ghosh et al. | |
| 2006/0198237 A1 * | 9/2006 | Johnson et al. | 365/233 |
| 2006/0236180 A1 | 10/2006 | Ong | |
| 2007/0255919 A1 | 11/2007 | Ware et al. | |
| 2008/0004831 A1 | 1/2008 | Li | |
| 2008/0034246 A1 * | 2/2008 | Kelly | 713/500 |

OTHER PUBLICATIONS

Notice of Allowance from related case, U.S. Appl. No. 11/118,600 for "Count Calibration For Synchronous Data Transfer Between Clock Domains" filed Apr. 29, 2005.

* cited by examiner

*Primary Examiner*—Shuwang Liu
*Assistant Examiner*—Hirdepal Singh

(57) ABSTRACT

Systems and methods for implanting synchronous data transfer between clock domains are disclosed. An exemplary system may comprise an adaptable data path having an input for receiving a signal from a first clock domain and an output in a second clock domain. A controller is operatively associated with the adaptable data path. The controller is responsive to operating parameters to configure the adaptable data path to align a logical clock pulse on the signal received from the first clock domain with the same logical clock pulse in the second clock domain based on a measured delay between the first and second clock domains.

19 Claims, 4 Drawing Sheets

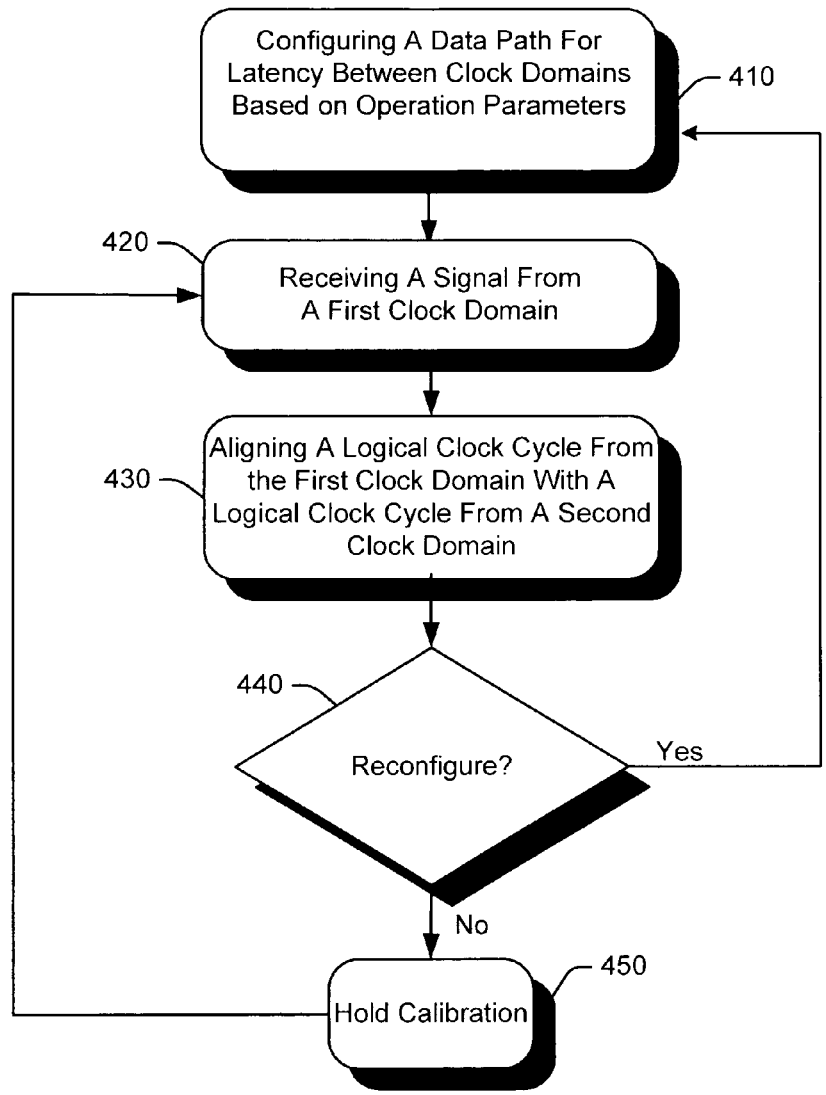

ADAPTABLE DATA PATH FOR SYNCHRONOUS DATA TRANSFER BETWEEN CLOCK DOMAINS

RELATED APPLICATIONS

This application contains subject matter related to co-owned U.S. patent application for "Edge Calibration For Synchronous Data Transfer Between Clock Domains" of Fischer, et al. Ser. No. 11/118,740, and co-owned U.S. patent application for "Count Calibration For Synchronous Data Transfer Between Clock Domains" of Fischer, et al. Ser. No. 11/118,600, each filed on the same day and hereby incorporated herein for all that is disclosed.

TECHNICAL FIELD

The described subject matter relates to synchronous data transfer, and more particularly to an adaptable data path for synchronous data transfer between clock domains.

BACKGROUND

Synchronous digital circuits (e.g., microprocessors) use internal clock signals to control operation sequences and timing of events. Some digital systems implement multiple clock domains in which the clock frequency in each domain is the same and skew within each domain is tightly controlled. However, skew between clock domains may negatively impact setup and hold constraints, resulting in non-determinism for signals crossing between domains. This skew between clock domains is magnified at higher frequencies.

Although asynchronous circuit design may be implemented where the magnitude of skew between clock domains is not known or cannot be held within acceptable bounds, synchronous circuit design is generally preferred for enhanced performance, deterministic data transfer, and more predictable behavior. Synchronous circuit designs typically employ a delay line, commonly referred to as a "salmon ladder," to transfer data synchronously between clock domains. The delay line includes delay components which match the source clock on one end of the delay line and increase in increments to match the sink clock on the other end of the delay line.

Delay lines, however, are typically matched to the source and sink clocks during design and do not account for various processing speeds, supply voltage effects, temperature effects, and frequency conditions during operation. In addition, the delay line may be constructed with different types of metal, field-effect transistors (FETs), and/or resistor-capacitor (R-C) components from what is used in the actual signal path. Any one or more of these factors may result in non-determinism, even in synchronous circuit designs which implement delay lines.

BRIEF DESCRIPTION OF THE DRAWINGS

FIG. 4 is a flowchart illustrating exemplary operations to implement synchronous data transfer between clock domains.

DETAILED DESCRIPTION

Systems and methods described herein may be implemented in a configurable data path for synchronous data transfer between clock domains. Exemplary embodiments may include a digitally-controlled data path which is configurable or adaptable for actual operating conditions. The data path handles data transfers between clock domains and provides deterministic data transfers between clock domains with sufficient margin to handle voltage and temperature variation across the operating range.

Briefly, the data path may be calibrated by measuring alignment between the source clock edge and the sink clock edge during run-time, allowing a setup/hold margin for the transfer to be determined and increased on a dynamic (or "as-needed") basis to cover circuit delay variation caused by voltage and temperature effects on the circuit. The calibration may then be used to configure the clocking and cyclic latency for a data path and configure clocks and multiplexer selects for the data path to implement deterministic transfers between the clock domains.

Exemplary embodiments shown and described herein specify a delay line from the late clock domain to the early clock domain. However, it is noted that in other exemplary embodiments, the delay line may be implemented from the early clock domain to the late clock domain.

It is also noted that operations described herein may be implemented in logic circuitry. Exemplary logic circuitry is shown and described herein for purposes of illustration. However, the exemplary logic circuitry is not intended to be limiting. Other embodiments, including software implementations, will also be readily apparent to those having ordinary skill in the art after having become familiar with the teachings herein.

Exemplary System

Figure 1:
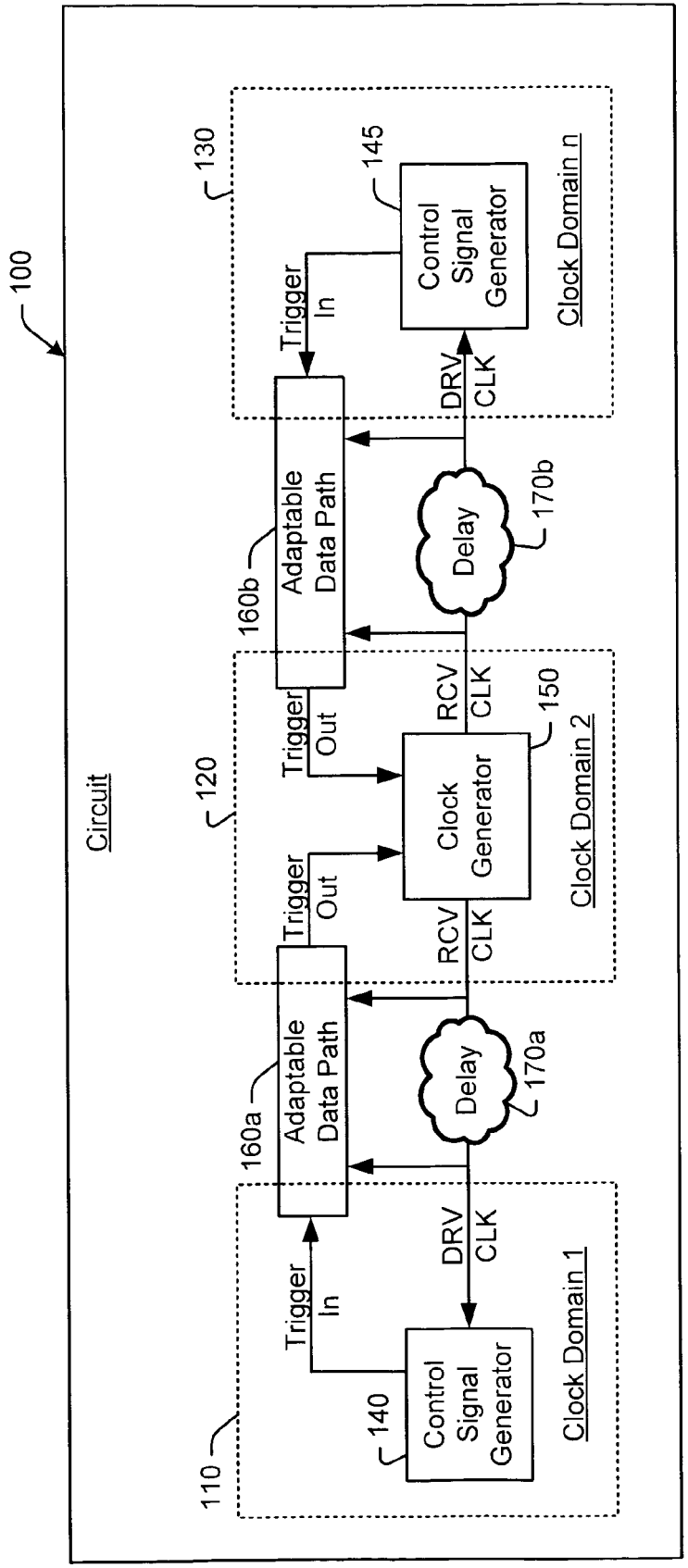
FIG. 1 is a high-level illustration of an exemplary circuit having a plurality of clock domains.

FIG. 1 is a high-level illustration of an exemplary circuit having a plurality of clock domains. Exemplary circuit 100 may be a circuit under test (or "test circuit"), such as, e.g., a microprocessor requiring deterministic cross-domain data transfers. For purposes of illustration, test circuit 100 is shown having a first clock domain 110, a second clock domain 120, and an $n^{th}$ clock domain 130. It is noted that circuits may have any number of clock domains, and the systems and methods described herein are not limited to use with circuits having any particular number of clock domains. Test circuit 100 may also include one or more control signal generators 140, 145, e.g., for generating control signals (or "trigger" signals) for test operations.

In an exemplary test operation, a clock generator 150 for the test circuit 100 may need to be stopped on a specific logical cycle, independent of frequency. For example, the clock generator 150 may need to be stopped for a serial scan of the test circuit data registers to troubleshoot a floating point error. Accordingly, control signal generator 140 may issue a clock-stop signal to the clock generator 150.

The clock-stop signal may originate in a first clock domain (e.g., clock domain 110) where the control signal generator 140 resides. However, the first (or "late") clock domain may be offset from a second (or "early") clock domain (e.g., clock domain 120) where the clock generator 150 resides, illustrated by delay 170a, b. Because the clock generator operates over a wide range of frequencies, these clock-stop signals cross between clock domains with high frequency dependent skew components.

For purposes of illustration, the late clock domain (e.g., clock domain 110) may be at logical clock cycle 3000 when the early clock domain (e.g., clock domain 120) is at logical clock cycle 3004. Therefore, a control signal generated in the late clock domain takes no less than four clock cycles to arrive in the early clock domain (i.e., 3004−3000=4). Accordingly, an event generated in the late clock domain needs to be delayed by four clock cycles before being issued to the early clock domain so that data arrives in the early clock domain at the desired logical clock cycle.

In exemplary embodiments, the control signal may be issued from the late clock domain to the early clock domain via one or more adaptable (or configurable) data path 160a, 160b so that each clock domain receives the event (e.g., stop-clock signal) at the desired clock cycle. For example, the adaptable data path 160a, 160b may measure the difference in logical clock cycles between a receive clock (RCV CLK) signal issued by the clock generator 150, and a drive clock (DRV CLK) signal including the delay 170a between clock cycles. The adaptable data path 160a, 160b uses this measurement to adjust the control signal (or trigger-in signal) so that the control signal (or trigger-out signal) that is delivered to the early clock domain includes data (e.g., a stop-clock instruction) on the desired logical clock cycle.

Before continuing, it is noted that the adaptable data path 160a, 160b adjusts for significant delay between clock domains (illustrated at 170a, 170b). Any delay between the data path 160a, 160b and the clock generator 150 is considered to be negligible, and therefore does not violate setup and hold times.

Figure 2:
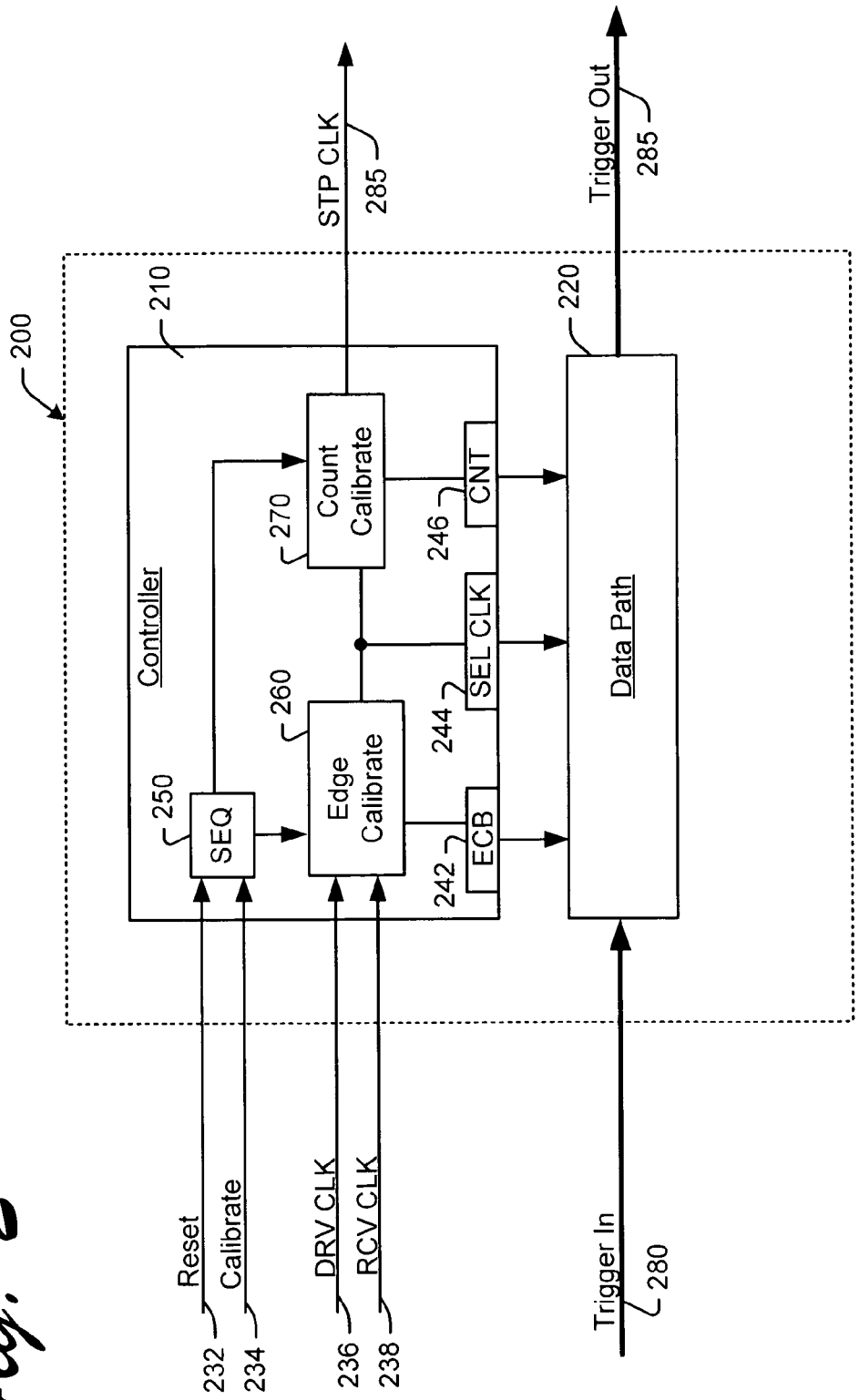
FIG. 2 is a functional block diagram of an exemplary system for synchronous data transfer between clock domains.

FIG. 2 is a functional block diagram of an exemplary system (such as adaptable data path 160a, 160b in FIG. 1) for synchronous data transfer between clock domains. Exemplary system 200 may include a controller 210 operatively associated with a data path 220. Controller 210 may be implemented to configure the data path 220 based on the latency between clock domains (e.g., clock domains 110-130 in FIG. 1) at run-time.

In an exemplary embodiment, logic functions of controller 210 and data path 220 are implemented in logic circuitry, as described in more detail below with reference to FIG. 3. Controller 210 may include inputs for receiving a reset signal 232, a calibrate signal 234, a drive clock (DRV CLK) signal 236, and a receive clock (RCV CLK) signal 238. Controller 210 may also include outputs for issuing an edge calibration bypass (ECB) signal 242, a select clock (SEL CLK) signal 244, a count (CNT) signal 246, and a stop clock (STP CLK) signal to the data path 220.

In operation, reset signal 232 may be issued to system 200 to return it to a predictable logic state and/or clear any prior configurations, e.g., at start-up or for recalibration. A sequencer 250 in controller 210 first activates an edge calibration circuit 260, and then activates a count calibration circuit 270.

Edge calibration circuit 260 may issue a bypass signal 242 to route the trigger-in signal 280 around a delay line in the data path 220, as explained in more detail below with reference to FIG. 3. In addition, edge calibration circuit 260 may be operated to select partial cycle (e.g., quarter cycle) sink-domain clocks for maximizing setup and hold times for transfers between clock domains. This calibration also improves the data path's tolerance of voltage and temperature variation after calibration. In an exemplary implementation where quarter cycle sink-domain clocks are selected, the minimum margin for each constraint is a quarter cycle and is sufficient to cover the delay range of clock distribution across the maximum voltage and temperature operating region of this embodiment. However, other margins may also be implemented.

Edge calibration 260 may operate in conjunction with count calibration circuit 270 to determine latency between clock domains. In an exemplary embodiment, the controller 210 may determine the latency by measuring the difference (or offset) in clock cycles between the drive clock (DRV CLK) signal 236 and the receive clock (RCV CLK) signal 238. In an example where the receive clock signal is at logical clock cycle 304 and the drive clock signal is at logical clock cycle 300, the latency between clock domains is 4 logical clock cycles. That is, an event generated in the first (e.g., drive) clock domain takes 4 logical clock cycles to arrive in the second (e.g., receive) clock domain.

Controller 210 issues select clock (SEL CLK) signals 244 and count (CNT) signals 246 to the data path 220 for allocating a predetermined number of cycles (N) to transfer data. In an exemplary embodiment, N is greater than the maximum expected separation (M) between clock domains. Accordingly, controller 210 may configure data path 220 to occupy M minus N cycles of latency. For example, if M is selected to be 5 clock cycles, and there are 2 cycles of latency, the data path may be configured to increment the delay by 3 clock cycles (e.g., 5−2=3).

Exemplary embodiments of edge calibration and count calibration circuits are described in more detail in the related patent applications cross-noted above. For purposes of this application, it is sufficient to understand that the edge and count calibration is used by controller 210 to configure the clocking and cyclic latency for data path 220, as explained in more detail below with reference to FIG. 3.

Before continuing it is noted that the data path 220 may be configured at run-time so that the data path 220 is configured based on operational data for the circuit. Also in exemplary embodiments, the data path configuration may be maintained during operation, as constant recalibration may be intrusive to operation of the circuit. However, the data path 220 is adaptable and may be reconfigured, e.g., based on changes in the run-time environment.

Figure 3:
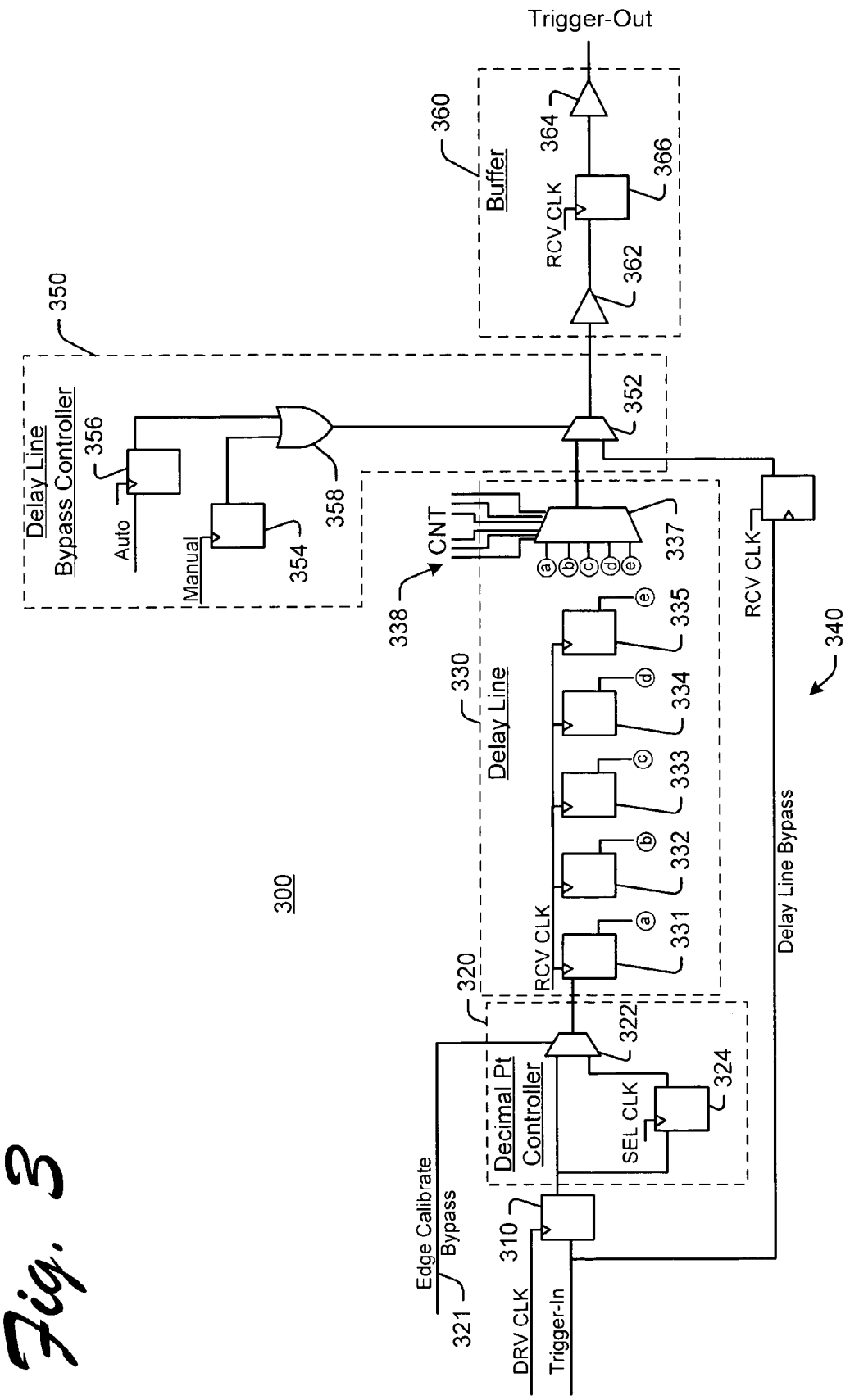
FIG. 3 is a schematic diagram illustrating an exemplary data path circuit.

FIG. 3 is a schematic diagram illustrating an exemplary data path circuit. Exemplary data path circuit 300 may be implemented as a logic circuit. For example, data path circuit 300 may include a number of semi-conductor components, such as, e.g., Complementary Metal-Oxide Semiconductor (CMOS) transistor devices. However, it is noted that the data path circuit may also be implemented in other circuitry as will be readily apparent to one having ordinary skill in the art after becoming familiar with the teachings shown and described herein.

Exemplary data path circuit 300 may include a late domain latch 310. Late domain latch 310 receives a trigger-in signal (e.g., trigger-in signal 280 in FIG. 2) and routes the trigger-in signal to delay line 330 via an optional decimal point controller 320.

Decimal point controller 320 receives edge calibration bypass signal 321 (e.g., from edge calibrator 260 in FIG. 2), and may be implemented to adjust for fractional clock cycles in the latency between clock domains. The edge calibrator also generates a select clock (SEL CLK) signal to transfer the trigger-in signal from late domain latch 310 to latch 331 in the receive clock domain while meeting set-up and hold time. For example, the latency between clock domains may be determined to include a fraction of a clock cycle (e.g., 3.3 clock cycles). Decimal point controller 320 adjusts the latency to a full clock cycle (e.g., 4.0 clock cycles).

In an exemplary embodiment, decimal point controller 320 includes a multiplexer (MUX) 325 which selects the trigger-in signal directly from the late domain latch 310, or selects the trigger-in signal via latch 324.

The trigger-in signal is issued to delay line 330 to modify the trigger-in signal for latency between clock domains. The trigger-in signal is modified by adding one or more latch 331-335 to the delay line using multiplexer (MUX) 337. Although five latches 331-335 are shown in FIG. 3, it is noted that any number of latches may be implemented. The number of latches implemented in delay line 330 may be determined, at least in some regard, by design considerations, such as, e.g., the expected latency between clock domains.

Delay line 330 may be operated by selecting the trigger-in signal from one of the plurality of latches 331-335 in order to provide a consistent signal delay. For example, if it is desired to consistently delay the trigger-in signal by N=5 clock cycles and the controller (e.g., controller 210 in FIG. 2) determines latency between clock domains to be 3 clock cycles at run-time, then MUX 337 may select the trigger-in signal after it has passed through 2 latches (e.g., latches 331 and 332). If the controller determines latency between clock domains to be 1 clock cycles at run-time, MUX 337 may select the trigger-in signal after it has passed through 4 latches (e.g., latches 331-334). Accordingly, MUX 337 effectively "adds" latches to the delay line 330 based on count calibration input 338 (e.g., from count calibration module 270 in FIG. 2) to adjust the trigger-in signal for latency between clock domains.

Data path circuit 300 may also include an optional delay line bypass 340. In an exemplary embodiment, delay line bypass 340 may be implemented to route the trigger-in signal past the delay line 330 directly to another clock domain. For example, delay line bypass 340 may be implemented if the controller (e.g., controller 210 in FIG. 2) determines that there is no latency between clock domains, if there is variation between clock domains in both the phase and frequency, and/or for test purposes to determine whether the system (e.g., system 200 in FIG. 2) is functioning properly.

Delay line bypass 340 may be operated by delay line bypass controller 350. Delay line bypass controller 350 may include a multiplexer (MUX) 352 to select the trigger-in signal from either the delay path 330 or delay line bypass 340. In an exemplary embodiment, MUX 352 may be activated (or deactivated) by input from either a manual override latch 354, or (via OR gate 358) by input from an automatic override latch 356.

Data path circuit 300 may also include a buffer 360. Buffer circuit 360 may be provided for timing convenience, e.g., easing timing constraints for sending the signal within the same clock domain. The exemplary embodiment shown in FIG. 3 is implemented with buffers 362, 364, and a latch 366, to add one clock cycle for entering the data path circuit 300 and another clock cycle for leaving the data path circuit 300.

As noted above, the exemplary embodiments shown and described are provided for purposes of illustration. Still other embodiments are also contemplated.

Exemplary Operations

FIG. 4 is a flowchart illustrating exemplary operations to implement synchronous data transfer between clock domains. As noted above, logic circuitry may be provided to execute operations 400. In an exemplary embodiment, the components and connections depicted in the figures may be used to implement synchronous data transfer between clock domains. It is also contemplated that in other embodiments, operations shown and described herein may be implemented as logic instructions (or software) for execution by a processor or processing units, e.g., for circuit modeling using computer devices.

In operation 410, a data path may be configured for latency between the first and second clock domains based on operating parameters. In operation 420, a signal may be received at the data path from the first clock domain. In operation 430, a logical clock cycle from the first clock domain may be aligned with the corresponding logical clock cycle in the second clock domain in the data path for synchronous data transfer between the first and second clock domains.

Optional operations may further include determining whether to reconfigure the data path in operation 440. If the data path is to be reconfigured, operations may continue to operation 410. Alternatively, the present configuration may be maintained in operation 450 and signals may continue through the data path as illustrated by the return path to operation 420, e.g., until a reset signal is received.

The operations shown and described herein are provided to illustrate exemplary implementations of synchronous data transfer between clock domains. Still other operations may also be implemented to enable synchronous data transfer between clock domains. By way of example, calibration operations may also be implemented. Exemplary calibration operations may include measuring a drive clock cycle in the first clock domain, measuring a receive clock cycle in the second clock domain, and determining latency based on the difference between the two measured clock cycles. Other exemplary operations may include calibrating the data path for variations in circuit delay (e.g., caused by voltage and temperature effects).

For purposes of further illustration, configuration operations may also include logically connecting and/or logically disconnecting latches in the data path. Gatekeeper operations may also be implemented. Exemplary gatekeeper operations may include passing the signal from the first clock domain to the data path if the latency satisfies a predetermined threshold (e.g., for a consistent delay between clock domains), and bypassing the signal directly from the first clock domain to the second clock domain if the latency fails to satisfy a predetermined threshold (e.g., if there is no latency between clock domains, if there is variation between clock domains in both the phase and frequency, and/or for test purposes).

In addition to the specific embodiments explicitly set forth herein, other aspects will be apparent to those skilled in the art from consideration of the specification disclosed herein. It is intended that the specification and illustrated embodiments be considered as examples only, with a true scope and spirit of the following claims.

The invention claimed is:

1. A system for synchronous data transfer between clock domains, comprising:
   a data path adaptable to align a control signal from a first clock domain to a second clock domain;
   a count calibrator operable to measure delay between the first and second clock domains;
   a controller operatively associated with the data path and the count calibrator, the controller responsive to operating parameters to configure the adaptable data path to align the control signal received on a logical clock cycle of the first clock domain to a logical clock cycle of the second clock domain based on the delay measured by the count calibrator; and
   wherein the adaptable data path is configured with a delay equal to M minus N where M is a maximum expected separation (M) of logical clock cycles between the first and second clock domains and N is a predetermined number of clock cycles needed to synchronously transfer data between the first and second clock domains.

2. The system of claim 1 wherein the measured delay is a difference between a receive clock signal and a drive clock signal.

3. The system of claim 1 wherein the data path includes a plurality of latches and a multiplexer, the multiplexer adding and removing latches from the data path.

4. The system of claim 3 wherein the data path includes at least one gatekeeper for the plurality of latches, the at least one gatekeeper passing the signal received from the first clock domain to the plurality of latches if the latency satisfies a predetermined threshold.

5. The system of claim 3 wherein the data path includes a bypass in parallel with the plurality of latches, the bypass routing the signal received from the first clock domain past the plurality of latches if the latency fails to satisfy a predetermined threshold.

6. The system of claim 1 further comprising an edge calibrator operatively associated with the controller, the edge calibrator determining a setup/hold margin to configure the data path for variations in circuit delay caused by voltage and temperature effects.

7. A method of synchronous data transfer between clock domains, comprising:
dynamically configuring a data path based on a latency between a first clock domain and a second clock domain at run-time;
receiving a signal from the first clock domain at the data path;
aligning in the data path a logical clock cycle on the signal from the first clock domain with an offset logical clock cycle in the second clock domain based on measured operating conditions of a circuit;
determining a maximum expected separation (M) of logical clock cycles between the first and second clock domains;
measuring a predetermined number (N) of clock cycles needed to synchronously transfer data between the first and second clock domains; and
configuring the data oath with a delay equal to M minus N.

8. The method of claim 7 further comprising determining the latency from a measured drive clock cycle in the first clock domain and a measured receive clock cycle in the second clock domain.

9. The method of claim 7 further comprising holding a configuration of the data path until receiving a reset signal.

10. The method of claim 7 wherein configuring includes logically connecting latches in the data path.

11. The method of claim 7 wherein configuring includes logically disconnecting latches in the data path.

12. The method of claim 7 further comprising passing the signal from the first clock domain to a plurality of latches in the data path if the latency satisfies a predetermined threshold.

13. The method of claim 7 further comprising bypassing the signal from the first clock domain around the plurality of latches if the latency fails to satisfy a predetermined threshold.

14. The method of claim 7 further comprising calibrating the data path for variations in circuit delay caused by voltage and temperature effects.

15. A configurable data path system, comprising:
means for measuring a latency between a first clock domain and a second clock domain;
means for aligning a first logical clock cycle on a signal from the first clock domain with a second logical clock cycle on a signal to the second clock domain based on the latency for synchronous data transfer between the first and second clock domains, wherein the means for aligning is responsive to measured operating conditions of a circuit;
means for determining a maximum expected separation (M) of logical clock cycles between the first and second clock domains;
means for measuring a predetermined number (N) of clock cycles needed to synchronously transfer data between the first and second clock domains; and
means for configuring the data with a delay equal to M minus N.

16. The system of claim 15 further comprising means for dynamically configuring the means for aligning based on the latency.

17. The system of claim 15 further comprising at least one gate keeper means for passing the signal from the first clock domain to the means for aligning if the latency satisfies a predetermined threshold.

18. The system of claim 15 further comprising bypass means for routing the signal in the first clock domain directly to the second clock domain if the latency fails to satisfy a predetermined threshold.

19. The system of claim 15 further comprising edge calibration means for configuring the alignment means to handle voltage and temperature effects on circuit delay.

* * * * *

UNITED STATES PATENT AND TRADEMARK OFFICE
CERTIFICATE OF CORRECTION

PATENT NO. : 7,477,712 B2  Page 1 of 1
APPLICATION NO. : 11/118632
DATED : January 13, 2009
INVENTOR(S) : Timothy C. Fischer et al.

It is certified that error appears in the above-identified patent and that said Letters Patent is hereby corrected as shown below:

On the face page, in field (57), under "Abstract", in column 2, line 1, delete "implanting" and insert -- implementing --, therefor.

In column 7, line 36, in Claim 7, delete "oath" and insert -- path --, therefor.

In column 8, line 29, in Claim 15, after "data" insert -- path --.

In column 8, line 35, in Claim 17, delete "gate keeper" and insert -- gatekeeper --, therefor.

Signed and Sealed this

Nineteenth Day of May, 2009

JOHN DOLL
*Acting Director of the United States Patent and Trademark Office*